(12) United States Patent
Mukai

(10) Patent No.: US 10,006,125 B2
(45) Date of Patent: *Jun. 26, 2018

(54) GOLD PLATE COATED MATERIAL

(71) Applicant: TOYO KOHAN CO., LTD., Tokyo (JP)

(72) Inventor: Nobuaki Mukai, Yamaguchi (JP)

(73) Assignee: TOYO KOHAN CO., LTD., Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/163,419

(22) Filed: May 24, 2016

(65) Prior Publication Data

US 2016/0265114 A1    Sep. 15, 2016

Related U.S. Application Data

(62) Division of application No. 14/414,655, filed as application No. PCT/JP2013/068956 on Jul. 11, 2013, now Pat. No. 9,388,497.

(30) Foreign Application Priority Data

Jul. 13, 2012  (JP) ................................. 2012-157180

(51) Int. Cl.
   *C23C 18/18*   (2006.01)
   *C23C 18/44*   (2006.01)
   (Continued)

(52) U.S. Cl.
   CPC .......... *C23C 18/1831* (2013.01); *B32B 15/01* (2013.01); *B32B 15/017* (2013.01);
   (Continued)

(58) Field of Classification Search
   CPC ..... C23C 18/42; C23C 18/16; C23C 18/1381; C23C 18/32; C23C 18/34; C23C 18/38;
   (Continued)

(56) References Cited

U.S. PATENT DOCUMENTS 4,804,410 A    2/1989  Haga et al.
9,388,497 B2   7/2016  Mukai
(Continued)

FOREIGN PATENT DOCUMENTS

CN           1388839 A     1/2003
CN         101410462 A     4/2009
(Continued)

OTHER PUBLICATIONS

Nuclear Magnetic Resonance on Amorphous Alloys, H.R. Khan and K. Luders, Physica Status Solidi (b), 108, 9 (1981).
(Continued)

*Primary Examiner* — Michael E. La Villa
(74) *Attorney, Agent, or Firm* — Muncy, Geissler, Olds & Lowe, PC

(57) ABSTRACT

A method of electroless gold plating includes a step of forming an underlying alloy layer on a base material and a step of forming a gold plate layer directly on the underlying alloy layer by electroless reduction plating using a cyanide-free gold plating bath. The underlying alloy layer is formed of an M1-M2-M3 alloy, where M1 is at least one element selected from Ni, Fe, Co, Cu, Zn, where Sn, M2 is at least one element selected from Pd, Re, Pt, Rh, Ag and where Ru, and M3 is at least one element selected from P and B.

6 Claims, 2 Drawing Sheets

(51) Int. Cl.
| | |
|---|---|
| *B32B 15/01* | (2006.01) |
| *H01M 8/0228* | (2016.01) |
| *C23C 18/38* | (2006.01) |
| *C23C 18/40* | (2006.01) |
| *C23C 30/00* | (2006.01) |
| *C23C 18/16* | (2006.01) |
| *C23C 28/02* | (2006.01) |
| *C23C 18/32* | (2006.01) |
| *C23C 18/54* | (2006.01) |
| *C23C 18/34* | (2006.01) |
| *C23C 18/52* | (2006.01) |
| *C23C 28/00* | (2006.01) |
| *B32B 15/04* | (2006.01) |
| *C23C 18/48* | (2006.01) |
| *C23C 18/50* | (2006.01) |
| *C23C 18/42* | (2006.01) |
| *C22C 19/00* | (2006.01) |
| *C22C 5/02* | (2006.01) |
| *C22C 21/06* | (2006.01) |
| *C23C 18/36* | (2006.01) |

(52) U.S. Cl.
 CPC .......... *B32B 15/018* (2013.01); *B32B 15/043* (2013.01); *C22C 5/02* (2013.01); *C22C 19/00* (2013.01); *C22C 21/06* (2013.01); *C23C 18/16* (2013.01); *C23C 18/165* (2013.01); *C23C 18/1633* (2013.01); *C23C 18/1651* (2013.01); *C23C 18/1653* (2013.01); *C23C 18/32* (2013.01); *C23C 18/34* (2013.01); *C23C 18/38* (2013.01); *C23C 18/40* (2013.01); *C23C 18/42* (2013.01); *C23C 18/44* (2013.01); *C23C 18/48* (2013.01); *C23C 18/50* (2013.01); *C23C 18/52* (2013.01); *C23C 18/54* (2013.01); *C23C 28/00* (2013.01); *C23C 28/02* (2013.01); *C23C 28/021* (2013.01); *C23C 30/00* (2013.01); *C23C 30/005* (2013.01); *H01M 8/0228* (2013.01); *C23C 18/36* (2013.01); *Y10T 428/1291* (2015.01); *Y10T 428/12708* (2015.01); *Y10T 428/12715* (2015.01); *Y10T 428/12722* (2015.01); *Y10T 428/12861* (2015.01); *Y10T 428/12868* (2015.01); *Y10T 428/12875* (2015.01); *Y10T 428/12882* (2015.01); *Y10T 428/12889* (2015.01); *Y10T 428/12896* (2015.01); *Y10T 428/12903* (2015.01); *Y10T 428/12917* (2015.01); *Y10T 428/12924* (2015.01); *Y10T 428/12931* (2015.01); *Y10T 428/12937* (2015.01); *Y10T 428/12944* (2015.01); *Y10T 428/12972* (2015.01); *Y10T 428/2495* (2015.01); *Y10T 428/24967* (2015.01); *Y10T 428/24975* (2015.01)

(58) Field of Classification Search
 CPC ......... C23C 18/40; C23C 18/54; C23C 30/00; C23C 30/005; C23C 18/44; C23C 18/1651; C23C 18/36; C23C 18/50; C23C 28/021; C23C 28/02; C23C 28/00; C23C 18/52; C23C 18/165; C23C 18/1653; C23C 18/1655; C23C 18/1633; C23C 18/48; C23C 18/1831; B32B 15/01; B32B 15/018; B32B 15/017; B32B 15/043; Y10T 428/12889; Y10T 428/12896; Y10T 428/12882; Y10T 428/12875; Y10T 428/12868; Y10T 428/12861; Y10T 428/12903; Y10T 428/1291; Y10T 428/12917; Y10T 428/12924; Y10T 428/12931; Y10T 428/12937; Y10T 428/12944; Y10T 428/12972; Y10T 428/12708; Y10T 428/12722; Y10T 428/12715; Y10T 428/24967; Y10T 428/2495; Y10T 428/24975; C22C 19/00; C22C 30/00; C22C 30/02; C22C 30/06; C22C 5/00; C22C 5/02; C22C 5/04; C22C 5/06; C22C 5/08; C22C 21/06; H01M 8/0228
 See application file for complete search history.

(56) References Cited

U.S. PATENT DOCUMENTS

| | | | |
|---|---|---|---|
| 2002/0123220 | A1 | 9/2002 | Sambucetti et al. |
| 2003/0008168 | A1 | 1/2003 | Shibuya et al. |
| 2004/0192019 | A1* | 9/2004 | Seshan ............ H01L 22/32 438/617 |
| 2007/0160867 | A1 | 7/2007 | Ng et al. |
| 2009/0069447 | A1 | 3/2009 | Kitamura |
| 2010/0258954 | A1* | 10/2010 | Andoh ............ H01L 23/49811 257/784 |
| 2011/0236720 | A1* | 9/2011 | Grimm ............ C25D 5/10 428/670 |

FOREIGN PATENT DOCUMENTS

| | | |
|---|---|---|
| JP | 05-335315 | 12/1993 |
| JP | 2005-054267 | 3/2005 |
| WO | WO 2007/116769 | 10/2007 |

OTHER PUBLICATIONS

European Search Report dated Feb. 24, 2016 in application No. 13816391, pp. 1-7.
Chinese Office Action dated Nov. 28, 2016 from corresponding Application No. 201380037493.X; 16 pages.
Office Action dated Oct. 3, 2016 issued in U.S. Appl. No. 15/163,437 (10 pages).
Japanese Office Action dated May 2, 2017 from corresponding Application No. 2014-524860 (w/English-language translation).
Final Office from corresponding U.S. Appl. No. 15/163,437 dated May 2, 2017 (13 pgs.).
European Search Report in application No. 13816391.0-1103 dated Apr. 24, 2018; pp. 1-5.

\* cited by examiner (A) Example 1 — Gold plate layer (B) Example 2 — Gold plate layer (C) Example 3 — Gold plate layer (D) Comparative Example 1 — Ni-P plate layer (E) Comparative Example 2 — Gold plate layer / Palladium plate layer

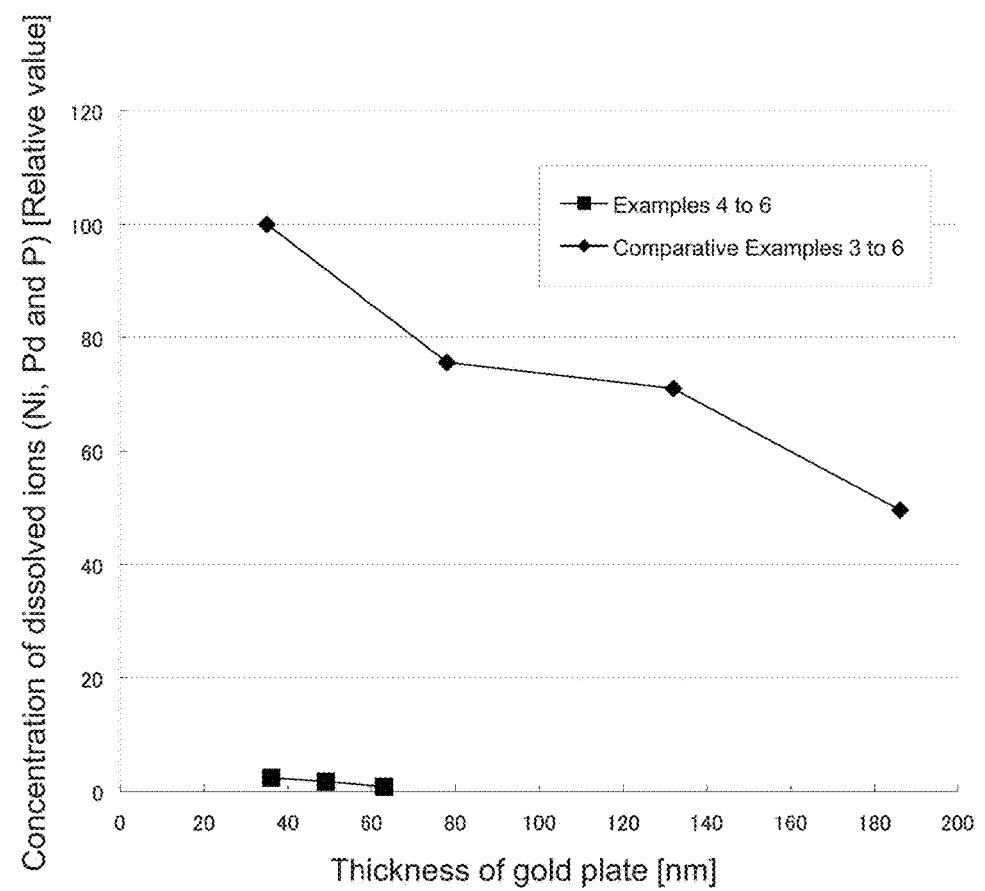

GOLD PLATE COATED MATERIAL

CROSS-REFERENCE TO RELATED APPLICATIONS

This application is a Divisional of co-pending application Ser. No. 14/414,655 filed on Jan. 13, 2015, which is a U.S. National Stage of International Application No. PCT/JP2013/068956 filed on Jul. 11, 2013, for which priority is claimed under 35 U.S.C. § 120; and this application claims priority of Application No. 2012-157180 filed on Jul. 13, 2012 in Japan under 35 U.S.C. § 119, the entire contents of all of which are hereby incorporated by reference.

BACKGROUND OF THE INVENTION

1. Technical Field of the Invention

The present invention relates to a method of electroless gold plating and a gold plate coated material.

2. Description of the Related Art

Heretofore, as a method of forming a gold plate layer on a surface of an electrical contact material such as used for connectors, switches or printed wiring boards, there has been known a method of performing electroless substitution gold plating on a surface of a metallic base material.

However, such a method of forming a gold plate layer by means of electroless substitution gold plating may involve problems as below. That is, when the electroless substitution gold plating is performed, the metallic base material as a material to be plated with gold may locally dissolve to generate micro recesses at the surface of the metallic base material. The micro recesses thus generated will cause poor deposition of gold, so that pinholes may occur at the surface of the gold plate layer to be formed. This may lead to problems in that the obtained electrical contact material deteriorates in its corrosion resistance and conductivity and delamination occurs at an interface with solder when the electrical contact material is connected with another component by soldering.

On the other hand, in order to solve such problems due to pinholes, there may be used a method of further performing electroless reduction gold plating on the gold plate layer formed by the electroless substitution gold plating thereby to cover the pinholes. In this method, however, the gold plate layer may have to be formed with a large thickness in total to allow the electroless reduction gold plating to cover the pinholes, which may be problematic in cost.

In view of the above, Patent Document 1 (Japanese Patent Application Publication No. 2005-54267) discloses a method of performing palladium plating to form a palladium plate layer on a base material and thereafter forming a gold plate layer on the palladium plate layer by means of electroless reduction gold plating.

SUMMARY OF THE INVENTION

The above technique of Patent Document 1, however, employs a cyanide-based gold plating bath to form the gold plate layer and therefore requires treating the cyanide-containing waste liquid having high toxicity, and is thus problematic in that the loads to working environment and external environment are high. There may be proposed to use a cyanide-free gold plating bath as substitute for the cyanide-based gold plating bath to perform electroless reduction plating on the palladium plate layer, but in this case a problem may arise in that the gold plate layer obtained has a considerably low coverage and also considerably low interfacial adhesion property.

The present invention has been made in consideration of such actual circumstances, and an object of the present invention is to provide a method of electroless gold plating which can form a gold plate film excellent in the interfacial adhesion property and suppressed from the occurrence of pinholes and which is improved in the loads to working environment and external environment.

As a result of intensive studies to achieve the above object, the present inventor has found that the above object can be achieved by forming an underlying alloy layer constituted of certain elements on a base material and forming a gold plate layer on the underlying alloy layer by means of electroless reduction plating using a cyanide-free gold plating bath, and has accomplished the present invention.

That is, according to an aspect of the present invention, there is provided a method of electroless gold plating, comprising a step of forming an underlying alloy layer on a base material and a step of forming a gold plate layer directly on the underlying alloy layer by means of electroless reduction plating using a cyanide-free gold plating bath. The method is characterized in that the underlying alloy layer is formed of an M1-M2-M3 alloy (where M1 is at least one element selected from Ni, Fe, Co, Cu, Zn and Sn, M2 is at least one element selected from Pd, Re, Pt, Rh, Ag and Ru, and M3 is at least one element selected from P and B).

According to another aspect of the present invention, there is provided a gold plate coated material comprising: a base material; an underlying alloy layer formed on the base material; and a gold plate layer formed on the underlying alloy layer. The gold plate coated material is characterized in that the underlying alloy layer is formed of an M1-M2-M3 alloy (where M1 is at least one element selected from Ni, Fe, Co, Cu, Zn and Sn, M2 is at least one element selected from Pd, Re, Pt, Rh, Ag and Ru, and M3 is at least one element selected from P and B).

According to the present invention, there can be provided a method of electroless gold plating which can form a gold plate film excellent in the interfacial adhesion property and suppressed from the occurrence of pinholes and which is improved in the loads to working environment and external environment.

BRIEF DESCRIPTION OF DRAWINGS

FIG. 2 is a graph which shows concentrations of dissolved ions from the gold plate coated materials obtained in Examples and Comparative Examples.

DESCRIPTION OF THE PREFERRED EMBODIMENT

Figure 1:
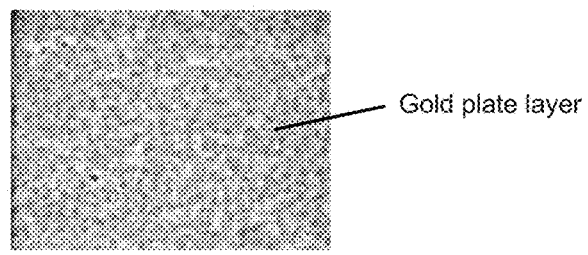
FIG. 1 is a set of SEM photographs of surfaces of gold plate coated materials obtained in Examples and Comparative Examples.
Figure 1:
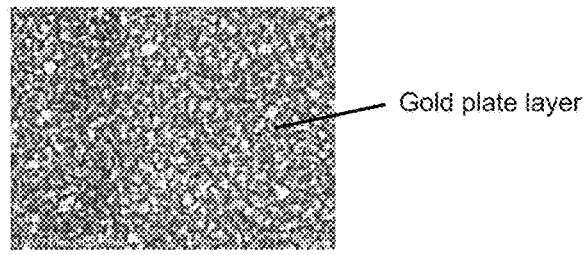
Figure 1:
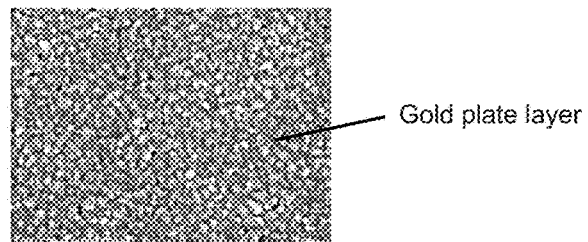
Figure 1:
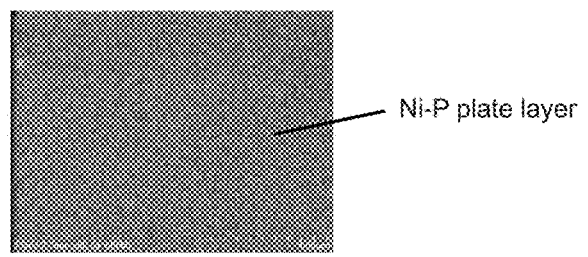
Figure 1:
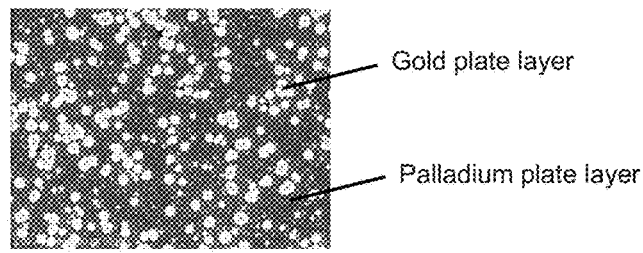

The method of electroless gold plating according to the present invention will hereinafter be described.

The gold plate coated material obtained through the method of electroless gold plating according to the present invention comprises an underlying alloy layer and a gold plate layer on a base material, and is characterized in that the underlying alloy layer is formed of an M1-M2-M3 alloy (where M1 is at least one element selected from Ni, Fe, Co, Cu, Zn and Sn, M2 is at least one element selected from Pd, Re, Pt, Rh, Ag and Ru, and M3 is at least one element selected from P and B).

<Base Material>

The base material is not particularly limited. Examples of the base material include steel, stainless steel, Al, Al alloy, Ti, Ti alloy, Cu, Cu alloy, Ni, and Ni alloy. The shape and form of the base material are not particularly limited, and may be appropriately selected depending on the use. For example, the base material may be used after being worked into a necessary shape or form depending on its use, such as a conductive metal component worked into a linear form or a plate or sheet-like form, a conductive member obtained by working a plate or sheet into an irregular form, and an electronic device component worked into a spring-like or tubular form. The thickness (such as diameter and sheet or plate thickness) of the base material is also not particularly limited, and may be appropriately selected depending on the use.

<Underlying Alloy Layer>

The underlying alloy layer is an underlying layer for smoothly forming the gold plate layer and is formed of an M1-M2-M3 alloy. Here, the M1-M2-M3 alloy is constituted of M1, M2 and M3 which are different elements from one another, where M1 is at least one element selected from Ni, Fe, Co, Cu, Zn and Sn, M2 is at least one element selected from Pd, Re, Pt, Rh, Ag and Ru, and M3 is at least one element selected from P and B.

The method of forming the underlying alloy layer is not particularly limited. The underlying alloy layer can be formed by an appropriate method such as electrolytic plating, electroless plating and sputtering. As will be described later, it is particularly preferred that the underlying alloy layer is formed by electroless plating.

M1 in the M1-M2-M3 alloy is at least one element selected from Ni, Fe, Co, Cu, Zn and Sn. One element may be solely used, or two or more elements may be used in combination, such as in Ni—Fe, Ni—Co and Ni—Cu. Each element that constitutes M1 is an element having a property capable of independently forming a plate layer on the base material, and has an action to allow the underlying alloy layer to adhere tightly to the base material. In view of preventing the plating liquid from self-decomposition and enhancing the stability of the plating liquid, it is preferred to use at least one element selected from Ni and Co as M1, and particularly preferred is to use Ni.

M2 in the M1-M2-M3 alloy is at least one element selected from Pd, Re, Pt, Rh, Ag and Ru. One element may be solely used, or two or more elements may be used in combination. Each element that constitutes M2 is an element having an autocatalytic action, and acts as a catalyst for the reaction of a reductant in the plating bath when deposited on the base material, i.e., has an action to continuously progress the metal deposition reaction. In view of keeping low cost, it is preferred to use at least one element selected from Pd and Ag as M2, and particularly preferred is to use Pd.

M3 in the M1-M2-M3 alloy is at least one element selected from P and B. One element may be solely used, or two elements may be used in combination, such as in P—B. Each element that constitutes M3 is a metalloid that constitutes a reductant in the plating bath for forming the underlying alloy layer, and will be unavoidably incorporated into the underlying alloy layer in general when the underlying alloy layer is formed. In view of preventing the plating liquid from self-decomposition and enhancing the stability of the plating liquid, it is preferred to use P as M3.

The ratio of each element in the M1-M2-M3 alloy is preferably such that M1 is 20 to 50 at %, M2 is 30 to 50 at %, and M3 is 20 to 30 at %. The M1-M2-M3 alloy may slightly contain impurities, which are unavoidably mixed therein, to such an extent that allows the gold plate layer to be appropriately formed on the M1-M2-M3 alloy and prevents the occurrence of unformed parts and pinholes in the gold plate layer. Examples of such unavoidable impurities include a heavy metal, such as Pb, Tl and Bi, which is added as a stabilizer that prevents the plating liquid from self-decomposition and stabilizes the plating liquid. In view of reducing the environmental load, Bi may preferably be used as the stabilizer. By adjusting the composition ratio of the M1-M2-M3 alloy within the above range, the underlying alloy layer may be smoothly formed on the base material, and the gold plate layer to be formed on the underlying alloy layer can also be smoothly formed with reduced occurrence of pinholes.

Respective elements for the M1-M2-M3 alloy may be arbitrarily combined to be used. In view of preventing the plating liquid from self-decomposition and enhancing the stability of the plating liquid, Ni—Pd—P alloy and Co—Ag—P alloy are preferred, and Ni—Pd—P alloy is particularly preferred.

Formation of the underlying alloy layer of M1-M2-M3 alloy can be performed by plating on the base material using a plating bath which contains elements represented by M1, M2 and M3 and to which a reductant and a complexing agent are added (underlying alloy electroless plating bath). For example, when forming an underlying alloy layer of Ni—Pd—P alloy, the underlying alloy electroless plating bath to be used can be obtained by mixing a nickel plating bath and a palladium plating bath which are commonly used. Examples of the nickel plating bath include a plating bath that contains: a nickel salt such as nickel chloride, nickel sulfate, nickel nitrate and nickel acetate; a phosphorus-containing reductant such as hypophosphite; and a complexing agent such as citric acid. Examples of the palladium plating bath include a plating bath that contains: a palladium salt such as palladium chloride; a phosphorus-containing reductant such as hypophosphite and phosphite; and a complexing agent such as thiodiglycolic acid. When the nickel plating bath and the palladium plating bath are mixed to prepare the underlying alloy electroless plating bath, it is preferred that nickel chloride is used as the nickel salt and palladium chloride is used as the palladium salt. Mixing ratio of the nickel plating bath and the palladium plating bath may appropriately be set in accordance with the ratio of respective elements that constitute the Ni—Pd—P alloy. The above exemplifies the case in which the underlying alloy layer is formed of Ni—Pd—P alloy, but also in the case in which the underlying alloy layer is formed of other alloy than Ni—Pd—P alloy, there may be used an underlying alloy electroless plating bath obtained by appropriately adjusting a plating bath which contains respective elements of M1, M2 and M3 and to which a reductant and a complexing agent are added.

It is preferred that the underlying alloy layer is formed using the above-described underlying alloy electroless plating bath under a condition of pH of 4.0 to 7.0, a bath temperature of 30° C. to 50° C., and an immersion time of 5 to 20 minutes.

The thickness of the underlying alloy layer may preferably be 0.01 to 1.0 µm, and more preferably 0.05 to 0.2 µm. The thickness of the underlying alloy layer being within the above range allows the gold plate layer to be smoothly formed on the underlying alloy layer by means of electroless reduction plating.

In the present invention, when the underlying alloy layer is formed on the base material, the underlying alloy layer may be formed directly on the base material, but a modifying layer may be provided to enhance the interfacial adhesion property between the base material and the underlying alloy layer. The modifying layer may appropriately be formed in accordance with properties of the base material and the underlying alloy layer. In view of enhancing the interfacial adhesion property with the underlying alloy layer, the modifying layer may preferably be a layer that contains the same element or elements as M1 of the M1-M2-M3 alloy which constitutes the underlying alloy layer. For example, when Ni—Pd—P alloy is employed as the underlying alloy layer, the modifying layer may preferably be a Ni-based layer that contains Ni as the element represented by M1. When such a Ni-based layer is formed by means of electroless reduction plating, the Ni-based layer may be a Ni—P plate layer. One modifying layer may be provided, or two or more modifying layers may also be provided. When two or more modifying layers are provided, components that constitute respective layers may be or may not be the same. The method of forming the modifying layer or layers is not particularly limited. The modifying layer or layers can be formed by an appropriate method such as electrolytic plating, electroless plating and sputtering.

<Gold Plate Layer>

The gold plate layer is a layer that is formed directly on the underlying alloy layer by using a cyanide-free gold plating bath to perform electroless reduction plating.

As described above, in the present invention, an excellent gold plate layer can be formed without pinholes by forming the underlying alloy layer of M1-M2-M3 alloy on the base material and forming the gold plate layer on the underlying alloy layer by means of electroless reduction plating. Therefore, according to the present invention, when a gold plate coated material formed with such a gold plate layer is used for various materials such as an electric contact material, it is possible to effectively prevent the deterioration in corrosion resistance and conductivity and the occurrence of delamination of solder when the gold coated material is connected with another component by soldering. In addition, according to the present invention, the layer of M1-M2-M3 alloy is formed as the underlying alloy layer thereby to allow the gold plate layer to be formed using a cyanide-free gold plating bath, and it is therefore possible to reduce loads to working environment and external environment. That is, there may not arise problems due to increased loads to working environment and external environment, which would be problematic if a cyanide-based gold plating bath was used.

As the cyanide-free gold plating bath to be used when forming the gold plate layer, there can be used a cyanide-free gold plating bath which is commonly used for electroless reduction plating, i.e., a plating bath that contains one or more kinds of gold salts, such as chloroauric acid salt, gold sulfite, gold thiosulfate, and gold thiomalate. The gold plate layer may preferably be formed using the cyanide-free gold plating bath which contains gold salt or salts as described above under a condition of pH of 7.0 to 8.5 and a bath temperature of 55° C. to 65° C. Immersion time in the gold plating bath when forming the gold plate layer is not particularly limited, and can be set depending on the necessary film thickness of the gold plate layer.

Conventionally, as the method of forming a gold plate layer on a base material, there has been used a method in which the electroless substitution plating is performed directly on the base material to form the gold plate layer. However, such a method of performing the electroless substitution gold plating involves problems in that the metallic base material as a material to be plated with gold may locally dissolve to generate recesses at the surface of the metallic base material, and the recesses thus generated will cause poor deposition of gold, so that pinholes may occur at the surface of the gold plate layer to be formed. In order to cover the pinholes thus generated, there has also been used a method of further performing electroless reduction gold plating after the gold plate layer is formed by the electroless substitution gold plating. In this method, however, the gold plate layer may have to be formed with a large thickness in total to allow the pinholes to be covered, which may be problematic in cost.

In contrast, according to the method of electroless gold plating of the present invention, the layer of M1-M2-M3 alloy is formed as the underlying alloy layer thereby to allow the gold plate layer to be formed using the electroless reduction plating without performing electroless substitution gold plating, and the problems due to such pinholes can thus be solved. In particular, according to the present invention, the layer of M1-M2-M3 alloy is formed as the underlying alloy layer thereby to allow the gold plate layer to be smoothly formed using the electroless reduction plating. Therefore, the gold plate layer may not have to be formed with a large thickness to solve the above-described problems due to pinholes.

The above-described method of electroless gold plating as disclosed in Patent Document 1 (JP 2005-54267 A), i.e., a method of performing electroless reduction palladium plating to form a palladium plate layer on a base material and thereafter forming a gold plate on the palladium plate layer by means of electroless reduction gold plating, employs a cyanide-based gold plating bath when forming the gold plate layer and therefore requires treating the cyanide-containing waste liquid having high toxicity, and is thus problematic in that the loads to working environment and external environment are high.

In contrast, according to the method of electroless gold plating of the present invention, a cyanide-free gold plating bath can be used to form the gold plate layer, and the loads to working environment and external environment can therefore be reduced.

The thickness of the gold plate layer may preferably be 1 to 200 nm, and more preferably 5 to 100 nm. If the thickness of the gold plate layer is unduly small, a uniform gold plate layer will not be formed on the underlying alloy layer, so that the corrosion resistance, conductivity and soldering property may possibly deteriorate when the gold plate layer is used as a part of a gold plate coated material. On the other hand, unduly large thickness of the gold plate layer may be disadvantageous in cost.

According to the method of electroless gold plating of the present invention, the underlying alloy layer of M1-M2-M3 alloy is formed on the base material, and the gold plate layer is formed on the underlying alloy layer by means of electroless reduction plating. Therefore, a gold plate coated material can be provided which is formed with an excellent gold plate layer without pinholes and which has good corrosion resistance, conductivity and soldering property. Such a gold plate coated material according to the present invention may be suitably employed as an electrical contact material such as used for connectors, switches or printed wiring boards.

Moreover, such a gold plate coated material according to the present invention may also be suitably employed as a separator for fuel cells, which is a member of a fuel cell. In particular, a separator for fuel cells has a surface formed with irregularities that function as flow channels for fuel gas or air, and takes a role to collect electrons generated at an electrode. Therefore, the irregular part may have to be smoothly formed with a gold plate layer, and the corrosion resistance and conductivity are also required. To this end, the gold plate coated material according to the present invention can be suitably used as such a separator for fuel cells because the gold plate coated material according to the present invention is formed with the gold plate layer by means of electroless reduction plating so that the gold plate layer is smoothly formed even for the irregular part to exhibit excellent corrosion resistance and conductivity.

EXAMPLES

The present invention will be more specifically described hereinafter with reference to examples, but the present invention is not limited to these examples.

Example 1

Electroless plating was performed to form a Ni—P layer (content ratio of P:12 wt %) on 5086 aluminum alloy of 5000 series provided by JIS H4000 (Si: 0.4 wt %, Fe: 0.5 wt %, Cu: 0.1 wt %, Mn: 0.2 wt %, Mg: 3.5 wt %, Zn: 0.25 wt %, Cr: 0.25 wt %, and Al: the balance) to have an arithmetic mean roughness Ra of the surface of 0.1 nm and a thickness of 10 μm, and a base material having a total thickness of 1.27 mm was thus prepared. Thereafter, the prepared base material was degreased and then washed with water, and electroless plating was performed using a Ni—P plating bath (ICP NICORON GM-NP, available from Okuno Chemical Industries Co., Ltd.) to form a Ni—P plate layer (content ratio of P:7 wt %) with a thickness of 2 μm on the base material.

Subsequently, for the base material formed with the Ni—P plate layer, plating was performed using a plating bath as below under a condition of 40° C. and 7 minutes to form a Ni—Pd—P alloy layer with a thickness of 0.79 μm on the Ni—P plate layer. The plating bath was obtained by mixing a Pd plating bath and a Ni—P plating bath as below with a ratio of (Pd plating bath):(Ni—P plating bath)=3:1 (volume ratio). With regard to the palladium salt, reductant and complexing agent in the plating bath, conventionally-known compounds were used.

<Pd Plating Bath>
Palladium salt: An amount as Pd of 0.15 wt % in the Pd plating bath
  Reductant: 1.8 wt %
  Complexing agent: 0.63 wt %
  Water: 97.2 wt %
  pH: 5.8
<Ni—P Plating Bath>
  Nickel salt (nickel chloride): 1.8 wt %
  Reductant (sodium hypophosphite): 2.4 wt %
  Complexing agent: 2.4 wt %
  Water: 93.2 wt %
  pH: 5.2
Next, for the base material formed with the Ni—P plate layer and the Ni—Pd—P alloy layer, electroless reduction plating was performed using a cyanide-free electroless reduction gold plating bath (SELF GOLD OTK, available from Okuno Chemical Industries Co., Ltd.) under a condition of 60° C. and 4 minutes to form a gold plate layer with a thickness of 55 nm on the Ni—Pd—P alloy layer, and a gold plate coated material was thus obtained.

Thereafter, for the obtained gold plate coated material, measurement was conducted using an inductively coupled plasma emission spectrometer (ICPE-9000, available from SHIMADZU CORPORATION). The composition of the Ni—Pd—P alloy layer was Ni:Pd:P=34:42:20 (at %), and the remainder was unavoidable impurities.

Appearance Evaluation of Gold Plate Layer and Confirmation of Gold Undeposited Part For the gold plate coated material thus obtained, visual observation and observation using a scanning electron microscope (S-4800, available from Hitachi High-Technologies Corporation) were conducted to confirm the appearance of the gold plate layer and presence or absence of gold undeposited part with respect to the surface of the obtained gold plate coated material. Evaluation results are listed in Table 1.

Evaluation of Interfacial Adhesion Property of Gold Plate Layer

Next, for the gold plate layer of the gold plate coated material, evaluation of the interfacial adhesion property was conducted. Specifically, the evaluation of the interfacial adhesion property was performed through: conducting a peel test by applying a pressure sensitive adhesive tape (NIC-ETACK powerfully adhesive tape, available from Nichiban Co., Ltd.) to the gold plate layer of the gold plate coated material and then peeling off the tape; and thereafter observing the delamination state of the gold plate layer, and evaluation was conducted in accordance with the criteria as below. Evaluation results are listed in Table 1.

○: Delamination of gold plate layer was not confirmed.
×: Delamination of gold plate occurred.

Example 2

A gold plate coated material was obtained like in Example 1 except for substituting the above-described Ni—Pd—P alloy layer with a Ni—Pt—P alloy layer and changing the condition, such as immersion time, in the electroless reduction plating for forming the gold plate layer thereby to form a gold plate layer with a different thickness of 5 nm. The Ni—Pt—P alloy layer was formed with a thickness of 50 nm on the Ni—P plate layer using a plating bath as below under a condition of 35° C., 10 minutes and pH of 4.0. The plating bath was obtained by mixing a Pt plating bath (IM-PT, available from JAPAN PURE CHEMICAL CO., LTD.) and the above-described Ni—P plating bath used when forming the Ni—Pd—P alloy layer with a ratio of (Pt plating bath):(Ni—P plating bath)=3:7 (volume ratio). Evaluation was conducted like in Example 1. Evaluation results are listed in Table 1.

Example 3

A gold plate coated material was obtained like in Example 1 except for substituting the above-described Ni—Pd—P alloy layer with a Co—Pd—P alloy layer and changing the condition, such as immersion time, in the electroless reduction plating for forming the gold plate layer thereby to form a gold plate layer with a different thickness of 5 nm. The Co—Pd—P alloy layer was formed with a thickness of 50 nm on the Ni—P plate layer using a plating bath as below under a condition of 60° C., 10 minutes and pH of 8.5. The plating bath was obtained by mixing a Pd plating bath (PALLA TOP, available from Okuno Chemical Industries Co., Ltd.) and a Co plating bath as below with a ratio of (Pd plating bath):(Co plating bath)=1:6 (volume ratio). Evaluation was conducted like in Example 1. Evaluation results are listed in Table 1.

<Co Plating Bath>
Cobalt salt (cobalt sulfate): 10 g/L
Reductant (sodium hypophosphite): 25 g/L
Complexing agent (trisodium citrate): 30 g/L
Complexing agent (sodium tartrate): 30 g/L
Complexing agent (glycine): 7.58 g/L
Lead acetate: 0.3 ppm Comparative Example 1

A gold plate coated material was obtained like in Example 1 except for not forming the above-described Ni—Pd—P alloy layer but using a cyanide-free electroless reduction gold plating bath (SELF GOLD OTK, available from Okuno Chemical Industries Co., Ltd.) to perform electroless reduction plating directly on the Ni—P plate layer. Evaluation was conducted like in Example 1. Evaluation results are listed in Table 1.

Comparative Example 2

A gold plate coated material was obtained like in Example 1 except for using a Pd plating bath (PALLA TOP, available from Okuno Chemical Industries Co., Ltd.) to form a palladium plate layer with a thickness of 0.5 μm on the Ni—P plate layer by means of electroless plating as substitute for forming the Ni—Pd—P alloy layer, and using a cyanide-free electroless reduction gold plating bath (SELF GOLD OTK, available from Okuno Chemical Industries Co., Ltd.) to perform electroless reduction plating directly on the palladium plate layer thus formed. Evaluation was conducted like in Example 1. Evaluation results are listed in Table 1.

property, and there was not confirmed any undeposited part of gold. By contrast, in Comparative Example 1 without forming such an underlying alloy layer, there was not formed any gold plate layer, so that the interfacial adhesion property of gold plate layer was not able to be measured. Also in Comparative Example 2 in which the palladium plate layer was formed as substitute for the underlying alloy layer, results were such that the gold plate layer had a considerably low coverage and the interfacial adhesion property was also poor.

FIG. 1 shows a set of photographs obtained by observing the surfaces of Examples 1 to 3 and Comparative Examples 1 and 2 using a scanning electron microscope. FIG. 1(A), FIG. 1(B), FIG. 1(C), FIG. 1(D) and FIG. 1(E) correspond to Example 1, Example 2, Example 3, Comparative Example 1 and Comparative Example 2, respectively. With regard to Examples 1 to 3, the gold plate layers were confirmed to be uniformly formed, as shown in FIG. 1(A) to FIG. 1(C). With regard to Comparative Example 1, no gold plate layer was formed on the Ni—P plate layer, as shown in FIG. 1(D). With regard to Comparative Example 2, the gold plate layer was unevenly formed (white parts in FIG. 1(E)), and undeposited parts of gold were occasionally observed, as shown in FIG. 1(E).

Examples 4 to 6

Gold plate coated materials were obtained like in Example 1 except for changing the condition, such as immersion time, in the electroless reduction plating for forming the gold plate layers so that the thicknesses of the gold plate layers to be obtained would be 36 nm (Example 4), 49 nm (Example 5) and 63 nm (Example 6).

Comparative Example 3

With regard to Comparative Example 3, a gold plate coated material was obtained like in Example 1 except for not forming the Ni—Pd—P alloy layer but forming a gold plate layer directly on the Ni—P plate layer. The gold plate

TABLE 1

| | Underlying layer for gold plate layer | Evaluation of appearance | Presence or absence of undeposited part | Evaluation of interfacial adhesion property |
|---|---|---|---|---|
| Example 1 | Ni—Pd—P alloy layer | Gold plate layer was smoothly formed without nonuniformity | Absent | ○ |
| Example 2 | Ni—Pt—P alloy layer | Gold plate layer was smoothly formed without nonuniformity | Absent | ○ |
| Example 3 | Co—Pd—P alloy layer | Gold plate layer was smoothly formed without nonuniformity | Absent | ○ |
| Comparative Example 1 | Ni—P plate layer | Gold plate layer was not formed | Present | Unmeasurable |
| Comparative Example 2 | Pd plate layer | nonuniformity occurred in gold plate layer | Present | x |

Results of Table 1 show that, in Examples 1 to 3 for which the method of electroless gold plating according to the present invention was used to form the Ni—Pd—P alloy layer, Ni—Pt—P alloy layer or Co—Pd—P alloy layer as the underlying alloy layer and form the gold plate layer directly on the formed underlying alloy layer by means of electroless reduction plating using the cyanide-free gold plating bath, the gold plate layer thus formed exhibited good appearance without uneven plating and had good interfacial adhesion layer was formed with a thickness of 35 nm using a cyanide-free electroless substitution gold plating bath (FLASH GOLD NC, available from Okuno Chemical Industries Co., Ltd.) to perform electroless substitution plating under a condition of 55° C. and 1 minute and then using a cyanide-free electroless reduction gold plating bath (SELF GOLD OTK, available from Okuno Chemical Industries Co., Ltd.) to perform electroless reduction plating under a condition of 60° C. and 1 minute.

Comparative Examples 4 to 6

Gold plate coated materials were obtained like in Comparative Example 3 except for changing the condition, such as immersion time, in the electroless reduction plating for forming the gold plate layers so that the thicknesses of the gold plate layers to be obtained would be 78 nm (Comparative Example 4), 132 nm (Comparative Example 5) and 186 nm (Comparative Example 6).

Evaluation of Corrosion Resistance of Gold Plate Layer

For Examples 4 to 6 and Comparative Examples 3 to 6, evaluation of corrosion resistance was conducted with respect to the obtained gold plate coated materials. Specifically, the evaluation of corrosion resistance was performed through: masking each gold plate coated material with a polyimide tape to expose a surface area of 35 mm longitudinal and 20 mm lateral; immersing the gold plate coated material into sulfuric acid aqueous solution of 90° C. (volume: 80 ml, pH: 1) for 50 hours; thereafter taking out the gold plate coated material; and measuring concentrations of ions (Ni, Pd and P) dissolved from the gold plate coated material into the sulfuric acid aqueous solution using an inductively coupled plasma emission spectrometer (ICPE-9000, available from SHIMADZU CORPORATION). Results are shown in FIG. 2. The results shown in FIG. 2 are represented by relative values of the concentrations of dissolved ions (Ni, Pd and P) to a value of 100 when the thickness of the gold plate layer is 35 nm in Comparative Example 3.

Results of FIG. 2 show that, in Examples 4 to 6 for which the method of electroless gold plating according to the present invention was used, the dissolution of ions was able to be effectively suppressed to exhibit excellent corrosion resistance even when the thickness of the gold plate layer was small. In contrast, according to Comparative Examples 3 to 6 in which the underlying alloy layer was not formed, results were such that the dissolution of ions was not able to be suppressed, thus exhibiting poor corrosion resistance of the gold plate layers, even when the gold plate layer was formed with a large thickness.

What is claimed is:

1. An electrical contact comprising:
    a base material;
    an underlying alloy layer formed on the base material; and
    a gold plate layer, having a thickness of 5 to 200 nm, formed on the underlying alloy layer as an outermost surface layer which acts as an electrical contact point via its outermost surface,
    wherein the underlying alloy layer is formed of an M1-M2-M3 alloy,
    where M1 is at least one element selected from Ni, Fe, Co, Cu, Zn and Sn, M2 is at least one element selected from Pd, Re, Pt, Rh, Ag and Ru, and M3 is at least one element selected from P and B, and
    wherein a ratio of each element in the M1-M2-M3 alloy is that M1 is 20 to 50 at %, M2 is 30 to 50 at %, and M3 is 20 to 30 at %.

2. The electrical contact as set forth in claim 1, further comprising a modifying layer which is formed on the base material in order to enhance the interfacial adhesion property between the base material and the underlying alloy layer.

3. The electrical contact as set forth in claim 1, wherein the thickness of the underlying alloy layer is 0.01 to 1.0 μm.

4. The electrical contact as set forth in claim 1, wherein the M1-M2-M3 alloy is Ni—Pd—P ternary alloy, and
    a ratio of each element in the Ni—Pd—P ternary alloy is that Ni is 20 to 50 at%, Pd is 30 to 50 at %, and P is 20 to 30 at %.

5. The electrical contact as set forth in claim 1, wherein the M1-M2-M3 alloy consists of M1, M2 and M3,
    where M1is one element selected from Ni, Fe, Co, Cu, Zn and Sn, M2 is one element selected from Pd, Re, Pt, Rh, Ag and Ru, and M3 is one element selected from P and B, and
    wherein a ratio of each element in the M1-M2-M3 alloy is that M1 is 20 to 50 at %, M2is 30 to 42 at %, and M3 is 20 to 30 at %.

6. The electrical contact as set forth in claim 1, further comprising a Ni—P plate layer which is formed between the base material and the underlying alloy layer.

* * * * *